March 21, 1950     V. AVERIN     2,501,301
POWER TRANSMISSION
Filed Nov. 14, 1945     4 Sheets-Sheet 2
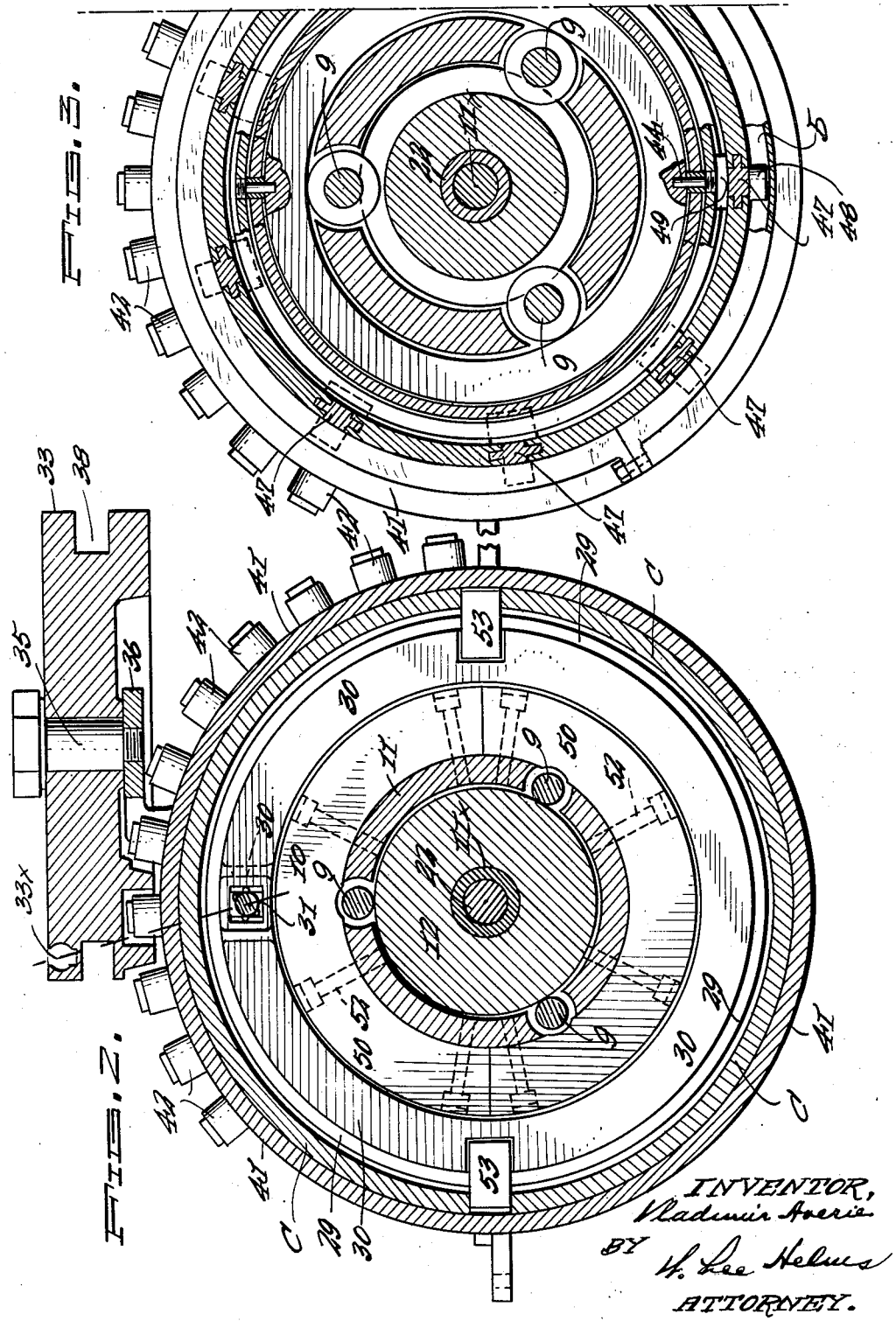
INVENTOR,
Vladimir Averin
BY W. Lee Helms
ATTORNEY.

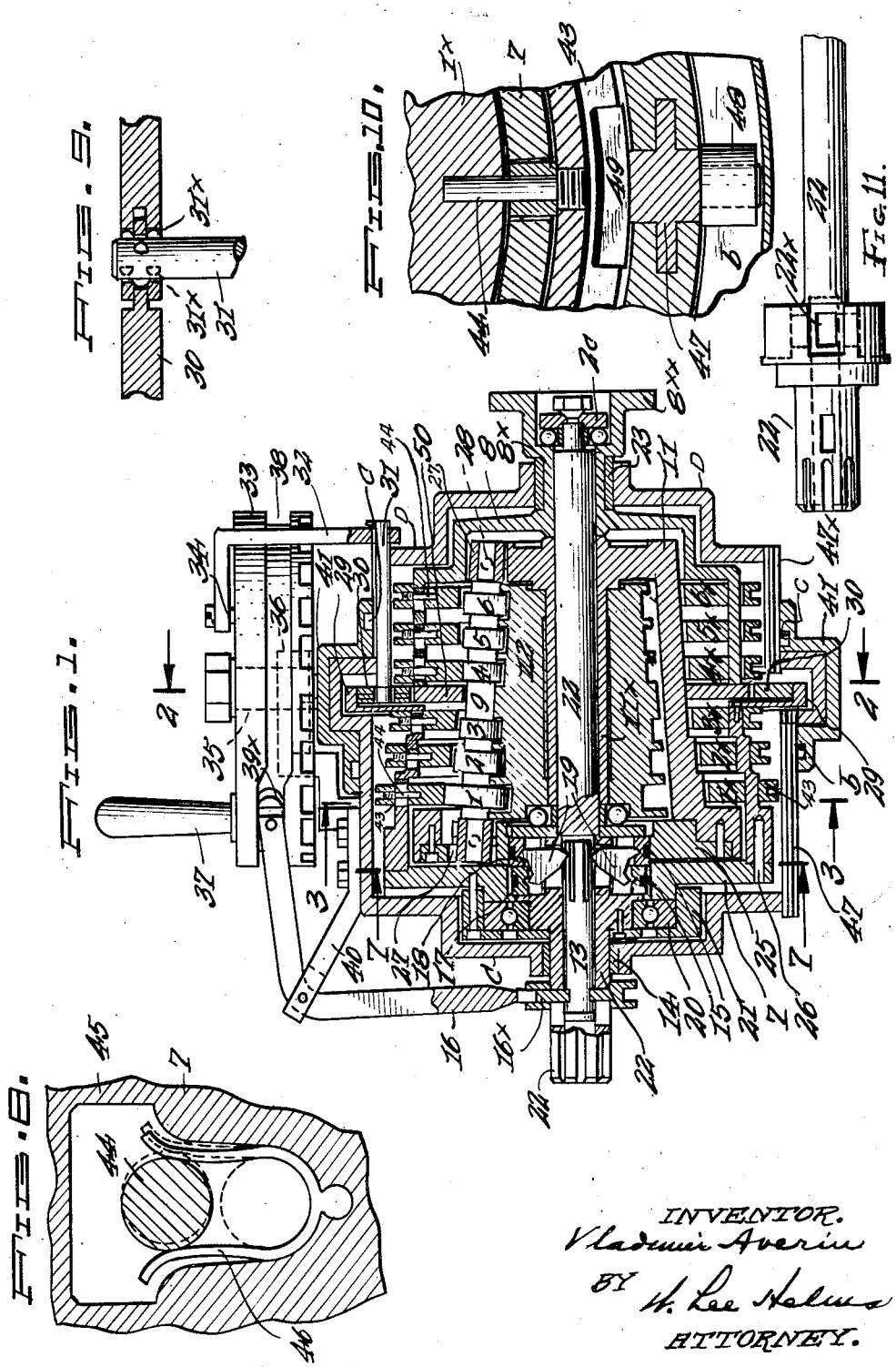

March 21, 1950 V. AVERIN 2,501,301
POWER TRANSMISSION
Filed Nov. 14, 1945 4 Sheets-Sheet 3
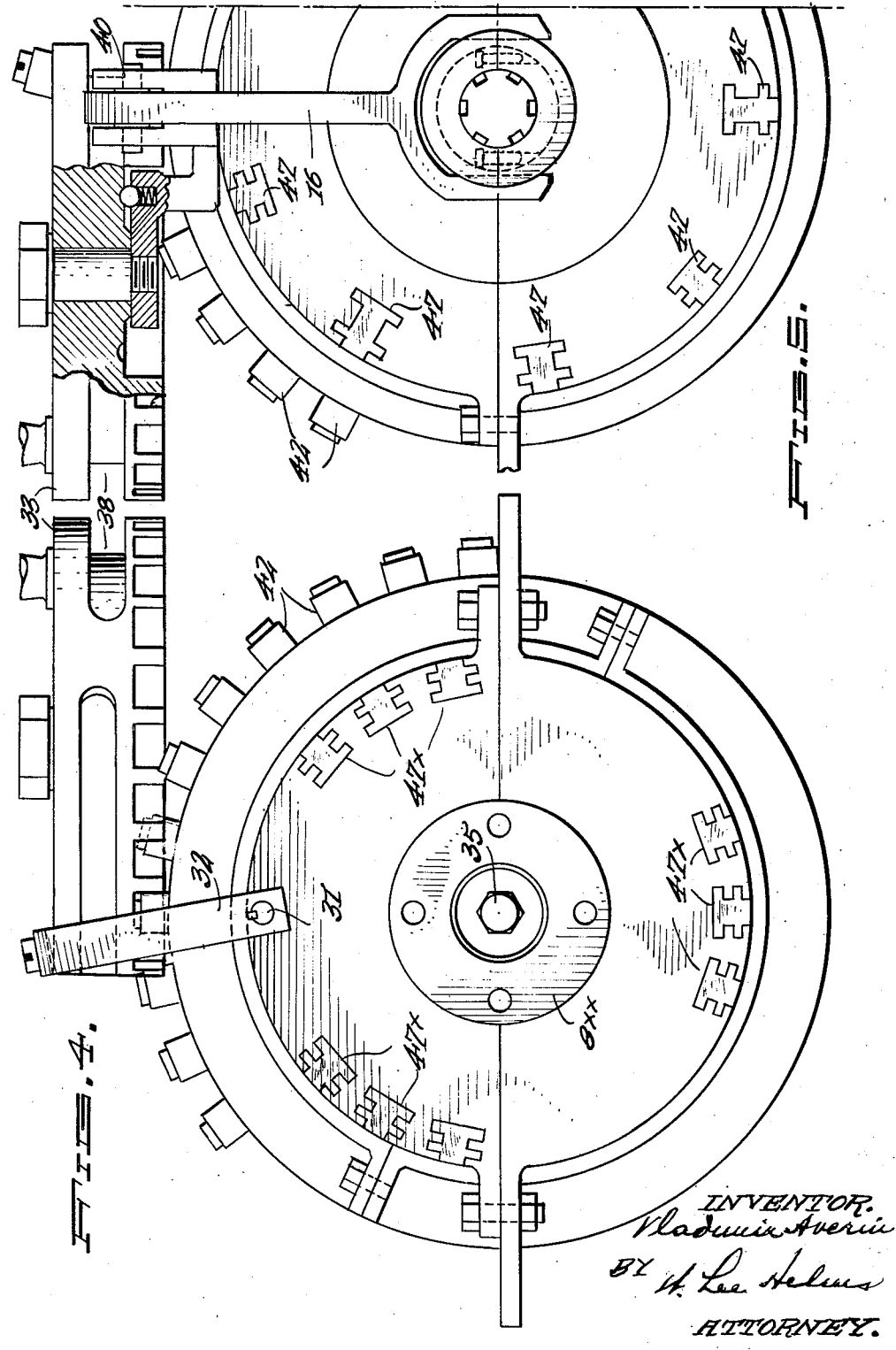
INVENTOR.
Vladimir Averin
BY W. Lee Helms
ATTORNEY.

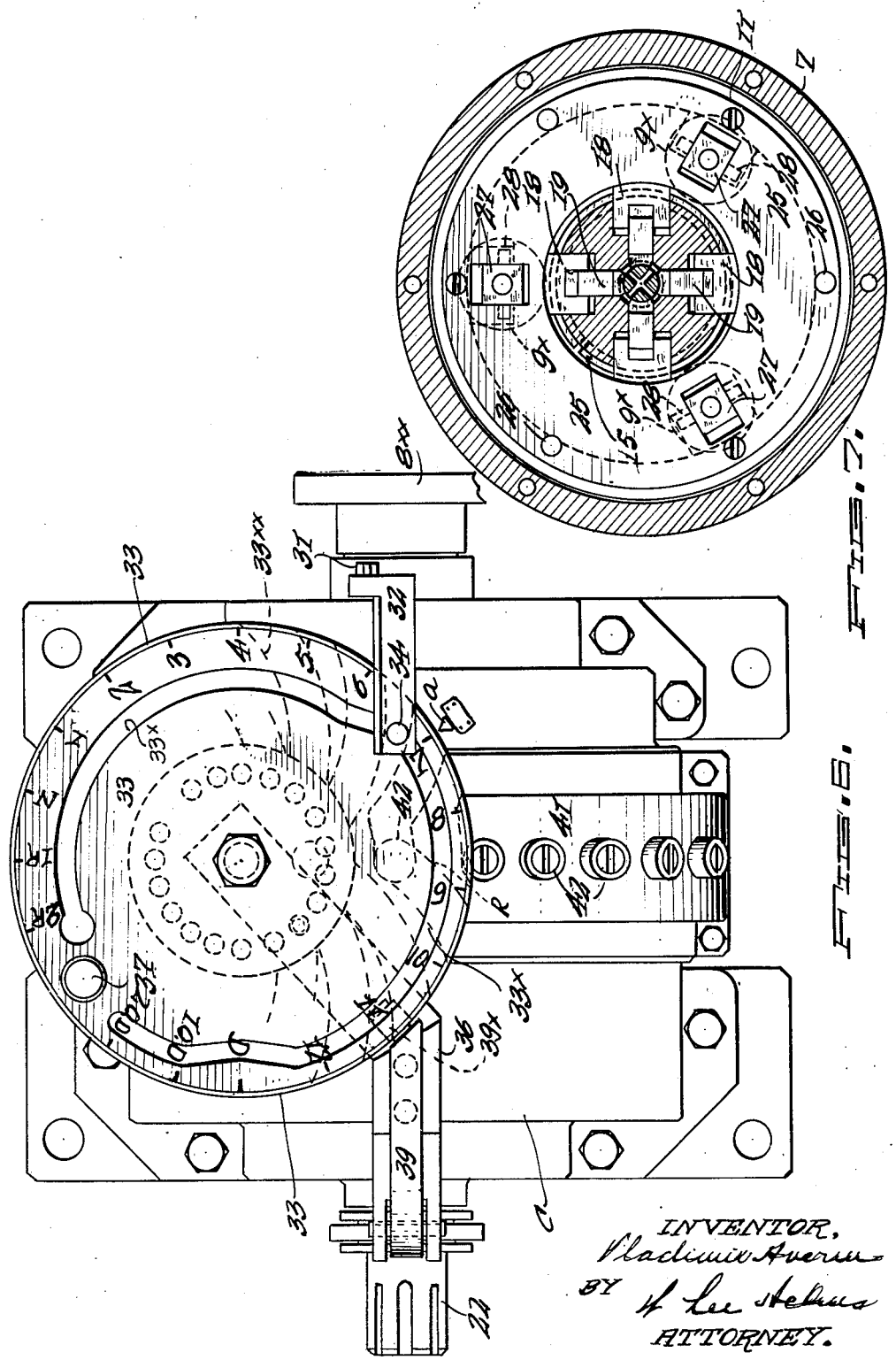

Patented Mar. 21, 1950

2,501,301

UNITED STATES PATENT OFFICE 2,501,301

POWER TRANSMISSION

Vladimir Averin, New York, N. Y.

Application November 14, 1945, Serial No. 628,554

9 Claims. (Cl. 74—755)

The object of the invention is to provide a readily operable transmission of such wide range as to be very flexible, and so constructed that the use of gears may be wholly avoided.

The invention will be described with reference to the accompanying drawings in which:

Fig. 1 is a longitudinal sectional elevation showing an embodiment of the invention Fig. 2 is an enlarged view in vertical section showing the cam ring and its actuator, the section being on the line 2—2, Fig. 1

Fig. 3 is an enlarged vertical section on the line 3—3, Fig. 1

Fig. 4 is an enlarged elevation looking from the rear of the transmission

Fig. 5 is an enlarged elevation partly in section looking toward the front of the transmission Fig. 6 is a top plan view Fig. 7 is a vertical section largely diagrammatic on the line 7—7, Fig. 1

Fig. 8 is an enlarged horizontal section through an area of one of the ring carriers, say carrier 7, in which a clearable opening is made for a pin connection between a transmission ring (not shown) and the channeled shift ring, a spring being shown for gripping the pin when the transmission ring is moved into and out of engagement with its appropriate roller surface of roller shaft (or shafts) 9, etc.

Fig. 9 is a fragmentary detail view in section of the brake device for ring carrier 7 and roller shaft carrier 11.

Fig. 10 is an enlarged fragmentary section taken about at the lower area of line 3, Fig. 1, to show the relation between the cam ring which moves the transmission rings into and engagement with the roller surfaces of shaft or shafts 9, and the elements intermediate the cam ring and one of the transmission rings which may be considered as $1^x$.

Fig. 11 is a plan view of the power receiving shaft, broken away at the rear end.

In the embodiment which is illustrated and which will now be described, and referring to Fig. 1, the primary elements consist of a main sectional casing D, split for connection of its sections, two internal cup-like ring carriers, 7, 8, a plurality of transmission rings $1^x$, $2^x$, $3^x$, within carrier 7, a plurality of rings $4^x$, $5^x$, $6^x$, within carrier 8, one or a plurality of rotatable shafts 9 each having roller-surfaces one for each ring, the roller surfaces being indicated at 1, 2, 3, 4, 5 and 6, a roller shaft carrier 11 for the roller shafts, a supporting member 12 for said roller shafts; a shifting channel-ring 43 for each transmission ring, a drive shaft 22 which receives motion from a suitable source, as for example an engine, and clutch devices, transmission ring shifting devices and brake devices, all automatically thrown into action by the rotation of a dialed control member in such manner that, as to the embodiment shown, direct drive, two overdrives, two reverse drives, and twelve intermediate speeds may be obtained at will.

Referring to the drawings it will be seen that casing C is provided at its left end with a bearing 14 for driving shaft 22 which is adapted to be connected to the engine or other power device. The front end section of shaft 22 is hollow to receive a clutch operating shaft 13, and is keyed thereto by the slide keys $16^x$ of a shifting fork device 16, the keys passing through slots in the shaft 22. Shaft 13 is axially slidable so as to operate two sets of clutch blocks 17, 18 through the action of rock levers 19. Ring carrier 7 rotates on a primary bearing member 20 held by an overcage 21, the latter being bolted to the cup-like ring carrier 7.

The rear end of shaft 22 lies within a rear hub-like extension $8^x$ of ring carrier 8 and the said extension is supported by a bearing 23 carried by outer casing C. As shown in Fig. 12, shaft 22 is formed with an intermediate enlargement having radial apertures $22^x$ for the rock levers 19 and for the clutch blocks 17 and 18.

Extension $8^x$ of ring carrier 8 is the driven member and it has a connecting end $8^{xx}$ for the device to be driven against which abuts a thrust-bearing assembly $2^c$ for shaft 22.

A long axial sleeve $11^x$ of the roller shaft-carrier 11 is received upon shaft 22, and upon sleeve $11^x$ is rotationally mounted the member 12 for the roller shafts 9. The member 12 is formed with clearance channels 10 for the roller areas of said shafts as shown particularly in Fig. 1.

In the present embodiment, and primarily for balance, three roller shafts 9 are employed, as indicated in the somewhat diagrammatic view Fig. 7, in which $9^x$ indicates the position of the roller shafts 9 relatively to a front supporting plate 25 which is secured by studs 26 to roller shaft carrier 11.

The roller shafts are self aligning and for this purpose their ends are journaled in bearing blocks, such as the blocks 27, Fig. 7, in cut away areas of the plate 25 and in the opposite portion of the carrier 11, these blocks being pivoted by pins 28, Fig. 7 (also Fig. 1).

A brake is provided for the roller shaft carrier 11 and the transmission ring carrier 7. To this end the latter has secured thereto a flanged brake drum 29ª in register with which is an expanding and contracting brake 30 which may be of any suitable form. Such a brake is shown, fragmentarily, in Fig. 10 and consists of a split ring with its ends slidingly held together by an operating shaft 31 having lugs 31$^x$ so arranged that when the shaft is turned in one direction the brake members are moved apart for braking ring carrier 7, rotation in the opposite direction retracting the members for braking roller shaft carrier 11. Brake shaft 31 has secured thereto a rock arm 32, Figs. 1 and 4, the upper bent end of the arm extending over dialed control-cam-member 33 and carrying a ball ended stud 34 within a cam groove at 33$^x$ (Fig. 6).

Cam control member 33 is, in the present embodiment, a thick disk having an axial bearing shaft 35, the latter being carried by a bracket arm 36 which may be rigidly attached to the casing D. The cam control member carries a turn handle 37.

In addition to the brake cam-groove at 33$^x$, the cam control member is formed with a peripheral or side cam-groove 38, Fig. 1, which receives a stud or roller 39$^x$ at the upper bent end of the shaft operating lever 16 the latter being pivoted on a bracket 40.

The said cam control member 33 also operates in the same manner as a reversing worm on a cam ring 41 which is employed to selectively move the transmission rings into and out of engagement with their appropriate roller surfaces of roller shaft 9 (or a plurality of such shafts when used). Cam ring 41 carries spaced rollers 42 which serve the same purpose as gear teeth. The marginal bottom face of the cam control member 33 is formed with spaced diagonal channels 33$^{xx}$ the side walls of the latter providing teeth, which bound the channels (Figs. 6 and 8).

When the cam control member 33 is rotated the cam ring 41 will be progressively rotated by the action of the teeth-like channel walls 33$^{xx}$ on the rollers. When the control member 33 has moved the cam ring from a neutral position (see Fig. 6), indicated by the registration of dial indication N with the arrow $a$, thence progressively to 6th speed (indicated by dial number 6) the teeth-like channel walls 33$^{xx}$ of the cam control member 33 are diagonally reversed with respect to the rollers 42 and the cam ring 41 is thereafter given a reverse step-by-step rotation to effect seventh to twelfth speeds, direct drive, and first and second overdrives. Neutral, and reverse (first and second reverse speeds, precede first speed).

As hereinbefore stated each transmission ring 1$^x$ to 6$^x$, inclusive, has as a part thereof a channeled shift ring 43, the two being connected by any suitable number of pins 44. A single reference character 43 will suffice for all of the shift rings, and the pins will be designated 44. Each shift ring 43 is carried directly upon its appropriate transmission ring carrier, 7 or 8 as the case may be, and the pin 44 projects through a transverse shift slot in the carrier (at 45, Fig. 9). In the shift slot for each pin is a yoke spring 46, Fig. 9. In the latter figure it will be seen that when the pin is moved from dotted line position to full line position spring 46 acts as a somewhat flexible gripping member to exact pressure proportionate to the force transmitted by the transmission ring when in engagement with a roller surface of roller shaft 9. This lateral movement is indicated by the dotted lines adjacent spring and pin in Fig. 9.

It has been stated that the rotation of cam ring 41 is employed to selectively move the transmission rings 1$^x$ etc. into and out of engagement with the roller surfaces on roller shaft or shafts 9. For this purpose cam ring 41 is formed with parallel internal cam grooves at $b$ and $c$, Figs. 1 and 8. The cam groove $b$ is for the transmission rings of carrier 7 and the cam groove $c$ is for the transmission rings of carrier 8.

The channeled shift ring 43 for each transmission ring 1$^x$ to 3$^x$, inclusive, is actuated, that is to say shifted laterally back and forth by three shift bars of which bar 47, Fig. 5, 1 and 11, is an example. Each shift bar 47 is provided with a roller, such as 48. Fig. 11, to lie in cam groove $b$ of cam ring 41 and also with a shift lug 49 which lies in the channel of its appropriate channeled shift ring 43. In this manner rotation of the cam ring 41 effects selective endwise back and forth movements of the shift bars 47 which results in selective engagement of transmission rings 1$^x$ to 3$^x$ with the transmission roller surfaces 1, 2 and 3. A single reference character 47 will suffice for all of the shift bars for said transmission rings 1$^x$, 2$^x$ and 3$^x$.

Likewise the channeled shift ring for each transmission ring 4$^x$, 5$^x$ and 6$^x$ is actuated by three shift bars of which bar 47$^x$, Fig. 1 is an example. Each shift bar 47$^x$ is provided with a roller 48 which lies in cam groove $c$ of cam ring 41, and also with a shift lug of the same form as 49 Fig. 11, which will lie in the channel of its appropriate channeled shift ring 43 for one of the transmission rings 4$^x$, 5$^x$ and 6$^x$. A single reference character 47$^x$ is used to designate all of the said shift bars.

*Operation*

In the position of the elements shown in Fig. 1 rollers 1 and 4 are engaged by transmission rings 1$^x$ and 4$^x$ and shaft 13 has been shifted inward to cause the driving shaft 22 to be clutched to the roller shaft carrier 11. Therefore the roller shaft will be given bodily rotation, and brake 30 has been moved by the action of cam groove 33$^x$ upon brake lever 32 to engage brake drum 29 (which is carried by transmission ring carrier 7), and to release brake ring 50 which is fixed to the roller carrier 11 as by studs 52, Fig. 2. The result is that the sixth forward speed is transmitted to ring carrier 8, via transmission ring 4$^x$ and hence to connecting end 8$^x$ for the device to be driven.

The brake and clutch position shown in Fig. 1 will be maintained throughout the rotation of the cam ring 41, through two reverse speeds, to neutral and through six forward speeds as follows with relation to engagement of the rollers and transmission rings:

| Dial Marking | Roller surfaces engaged with their appropriate transmission rings |
| --- | --- |
| R2 (Reverse No. 2) | 3 and 6 |
| R1 (Reverse No. 1) | 3 and 5 |
| N (Neutral) | 3 and 4 |
| 1 (First forward speed) | 2 and 6 |
| 2 (Second forward speed) | 2 and 5 |
| 3 (Third forward speed) | 2 and 4 |
| 4 (Fourth forward speed) | 1 and 6 |
| 5 (Fifth forward speed) | 1 and 5 |
| 6 (Sixth forward speed) | 1 and 4 |

When the cam control member moves from dial marking 6 to 7 cam groove 33$^x$ acts upon brake lever 32 to contract brake 30 (the latter being tied to the casing C by lugs 53, Fig. 2) with the result that the roller shaft carrier 11 is held fixed. Such movement of the cam control member (dial 6 to 7) does not, however, shift the cam ring 41 and roller surfaces 1 and 4 remain engaged with their appropriate transmission rings as will be seen by the position of the dotted line roller 42 in the neutral lead to the first reversing channel of the cam control member 33 shown in Fig. 6 at R.

At the same time cam groove 38 acts upon lever 16 to move shaft 13 outwardly and clutch said shaft to ring carrier 7 for bodily movement thereof. Also the brake 30 will engage the roller shaft carrier 11 and release ring carrier 7. When, however, the cam control member is moved from dial 7 to 8 the first reversing movement is imparted to cam ring 41 and therefore roller surfaces 1 and 5 will be brought into engagement with their appropriate transmission rings, this requiring movement only of the transmission ring $5^x$ for roller surface 5 and release of roller surface 4 by shift of its transmission ring $4^x$.

It will be understood that the reversing channels between the first one indicated in Fig. 6 and the end of the upper cam slot $33^x$ to the left of handle 37 will be as desired in number and that the dotted line showing of reversing channels in Fig. 6 is illustrative only, not in scale, and merely to show the principle of operation.

In the reversing movements of the cam ring 41, the roller surfaces 1 to 6 engaged at the various dial markings will be as follows:

| Dial Marking | Roller surfaces engaged with their appropriate transmission rings |
| --- | --- |
| 7 (Seventh forward speed) | 1 and 4 |
| 8 (Eighth forward speed) | 1 and 5 |
| 9 (Ninth forward speed) | 1 and 6 |
| 10 (Tenth forward speed) | 2 and 4 |
| 11 (Eleventh forward speed) | 2 and 5 |
| 12 (Twelfth forward speed) | 2 and 6 |
| D (Direct drive) | 3 and 4 |
| 1 O. D. (First overdrive) | 3 and 5 |
| 2 O. D. (Second overdrive) | 3 and 6 |

From the above it will be seen, with reference to Fig. 6, that first reverse and second reverse, each when in register with arrow or pointer $a$, will maintain the brake and clutch positions of Fig. 1. The reversing action is as follows:

In first reverse, roller surfaces 3 and 5 will be in engagement with their transmission rings 43, roller shaft carrier 11 will be clutched to the driving shaft 22 and ring carrier 7 will be held by the brake 30. Assuming that the roller shaft carrier rotates clockwise, roller surfaces 3 and 5 will be rotated counter-clockwise. Inasmuch as roller 5 is of greater diameter than roller 3, roller 5 in its combined bodily and rotating movement will act upon transmission ring carrier 8 to rotate it counter-clockwise.

In second reverse, rollers 3 and 6 are engaged with their respective transmission rings and inasmuch as roller 6 is of greater diameter than roller 5 the transmission ring carrier will be rotated counter-clockwise at greater speed than in first reverse.

When the elements are in neutral position the clutch and brake are in the position of reverse, i. e. Fig. 1 and rollers 3 and 4 are of the same effect diameters so that roller 4 simply will roll around its transmission ring without effect upon the latter, the ring acting merely as a trackway.

When the elements are in direct drive, rollers 3 and 4 are in engagement with their transmission rings. Ring carrier 7 is clutched to the driving shaft. Inasmuch as rollers 3 and 4 are of the same effective diameters their reaction on the roll carrier 11 will be balanced. Roll carrier 11 is released by movement of the brake 30 to intermediate and neutral position. Gradually the roll carrier 11 will obtain the same speed as ring carriers 7 and 8. When the elements are in direct drive there is no relative movement between them, the transmission revolving as a whole, and a direct lock is provided between driven end to driving end.

To secure over-drive, the first overdrive is obtained in a movement of the cam control member 33 when the dial indication 1-O. D. is brought into register with the pointer or arrow A. At this point the rollers 3 and 5 are brought into engagement with their transmission rings through shift of the latter, the roller shaft carrier 11 is engaged by the brake and held stationary, the transmission ring carrier 27 being released, and the clutch member connects the driving shaft with transmission ring carrier 7. The result is that the transmission ring for roller 3 rotates the roller shaft 9 to give a higher peripheral speed to roller 5 than roller 3, roller 5 being of greater diameter. The condition is the same with the second overdrive, rollers 3 and 6 engaging their transmission ring, and roller 6 having a greater diameter than either roller 3 or 5.

In all of the positions effected by "reverse" movement of the cam ring 41, to wit, forward speeds 7 to 12 and first and second overdrive, the roller shaft carrier 11 is held by the brake 30 and the ring carrier 7 is clutched to the shaft. But in direct drive, the roller shaft carrier 11 is free, the brake being in neutral position, as stated in detail above.

It will be understood that the means for rotating the cam ring and for operating the clutch and the brake may be widely varied from that used in the embodiment illustrated. Also, various changes may be made in the form and arrangement of the elements without departing from the spirit of the invention.

It will be seen that for adequate frictional engagement, the surfaces of the transmission rings are tapered in accordance with the degree of angularity of the surfaces of the rollers 1 to 6, these rollers being on roll shafts inclined relatively to the axis of their roller shaft carrier 11.

The spring rings 15, one for each clutch, act each to return its clutch to neutral position after being released.

What I claim and desire to secure by Letters Patent being as follows:

1. A transmission consisting of a driving shaft, a first and a second transmission ring carrier adapted to rotate about said shaft, at least one transmission ring on each transmission ring carrier, a roller shaft carrier rotatable about the shaft, a roller shaft on said carrier, at least one roller surface on said roller shaft adapted for peripheral engagement with a transmission ring of the first ring carrier, at least one roller surface on said roller shaft adapted for peripheral engagement with a transmission ring on the second carrier, means for selectively clutching the driving shaft to either the first ring carrier or the roller shaft carrier, means for selectively applying a brake to either the first ring carrier or the roller shaft carrier, and means for selectively imparting relative lateral movement to said roller shaft carrier and transmission rings for mutual engagement of said transmission rings and roller surfaces.

2. A transmission constructed in accordance with claim 1 in which the roller shaft is supported angularly of the roller shaft carrier.

3. A transmission constructed in accordance with claim 1 in which the mutually engaging faces of the transmission rings and the roller surfaces lie angularly of the driving shaft.

4. A transmission constructed in accordance with claim 1 in combination with a supporting member for the roller shaft carrier, said member being rotatably mounted on the driving shaft and being formed with peripheral channelways for reception of the roller surfaces and with bearing faces for the roller shaft at areas intermediate with the roller surfaces.

5. A transmission constructed in accordance with claim 1 in which the roller shaft carrier is constructed as a hollow drum, two sets of roller surfaces on the roller shaft, each set consisting of a plurality of roller surfaces equidistantly arranged longitudinally of the drum, the drum having a central longitudinal bearing sleeve, a backing member for the roller shaft rotatable upon said bearing sleeve and having channelways for reception of the roller surfaces and having bearing surfaces for the roller shaft intermediate the channelways, and means for selectively braking the first transmission ring carrier and the roller shaft carrier.

6. A transmission constructed in accordance with claim 1 in combination with a rotatable cam ring, cam surfaces provided by the ring, and means controlled by said cam surfaces and adapted for engagement with said transmission rings, to effect lateral shifting of said rings into and out of engagement with the roller surfaces.

7. A transmission constructed in accordance with claim 1 in which each transmission ring is provided with a plurality of peripherally projecting pins, each pin extending through a transverse aperture in the appropriate ring carrier, channel rings carried by said pins and yoke springs in the transverse aperture for engagement by the pins.

8. A transmission constructed in accordance with claim 1 in which each transmission ring is provided with a plurality of peripherally projecting pins, each pin extending through a transverse aperture in the appropriate ring carrier, shift rings carried by said pins and yoke springs in the transverse aperture for engagement by the pins.

9. A transmission consisting of a driving shaft, two transmission ring carriers adapted to rotate about said shaft and consisting of a first ring carrier and a second ring carrier, the first carrier having an end adapted for connection to the driving shaft, at least one transmission ring on each ring carrier, each ring carrier embracing a roller shaft carrier, the latter being rotatable about the driving shaft, at least one roller shaft on said carrier, a plurality of roller surfaces on said roller shaft, at least one roller surface in register with the first ring carrier and at least one roller surface in register with the second ring carrier, means for selectively clutching the driving shaft to either the first ring carrier or the roller shaft carrier, means for selectively applying a brake to either the first ring carrier or the roller shaft carrier, and means for imparting a plurality of successive relative lateral movements between said roller shaft and transmission rings for mutual engagement and disengagement of selected roller surfaces and selected transmission rings.

VLADIMIR AVERIN.

REFERENCES CITED

The following references are of record in the file of this patent:

UNITED STATES PATENTS

| Number | Name | Date |
|---|---|---|
| 861,791 | Anderson | July 30, 1907 |
| 1,081,642 | Willis | Dec. 16, 1913 |
| 1,202,910 | Smith | Oct. 31, 1916 |
| 2,126,508 | Schmitter | Aug. 9, 1938 |